Patented Mar. 5, 1935

1,993,706

UNITED STATES PATENT OFFICE 1,993,706

MANUFACTURE OF EMULSIONS

Herbert Langwell, Epsom, England, assignor to The Distillers Company Limited, Edinburgh, Great Britain No Drawing. Application March 11, 1932, Serial No. 598,307. In Great Britain March 23, 1931

14 Claims. (Cl. 252—6)

This invention relates to the manufacture of emulsions and has particular reference to the manufacture of emulsions of substances insoluble or substantially insoluble in water but soluble in organic liquids of the polar type. Such emulsions have a variety of uses dependent upon the substance emulsified; they may for example be adapted for the prevention of dry rot in timber, or the waterproofing of fabrics, or the dyeing of silk, or the killing of insects.

In the manufacture of emulsions when the disperse phase is slightly soluble in the continuous phase it is not possible to reduce the amount of disperse phase below that concentration corresponding to the solubility of the disperse phase in the continuous phase at that temperature. This accounts for the limited use hitherto of a variety of substances in dilute emulsion form.

The chief object therefore of the present invention is to enable stable emulsions to be obtained of greater dilution in disperse phase than hitherto and to allow of the use as disperse phase of a wider range of substances.

According to the present invention the above stated object is achieved by employing as a component of the emulsion a suitable salting out agent, i. e. an agent adapted to reduce the solubility of the disperse phase in the continuous phase.

Generally speaking, the disperse phase according to the present invention consists of a saturated or at least concentrated solution of the selected water-insoluble substance in the appropriate organic liquid, and the continuous phase consists of a relatively great amount of water containing in solution a salt adapted to serve as salting out agent as above explained.

Suitable solvents for the selected water-insoluble substance are alcohols such as butyl or amyl alcohol, ketones such as diacetone alcohol, esters such as butyl lactate or amyl acetate, and other organic liquids of the polar type as distinct from liquids such as petroleum, turpentine, benzene, carbon disulphide and such non-polar solvents.

Suitable salting-out agents are water soluble salts which will not react with the materials to be emulsified and it has been found that sodium sulphate, sodium chloride and sodium acetate are particularly useful. By using such agents stable dilute emulsions containing very small amounts of disperse phase consisting of moderately soluble substances can be prepared.

The more soluble the disperse phase employed the greater the amount of salting out agent required. Also the less the amount of disperse phase employed, while nevertheless ensuring a stable emulsion, the greater the amount of salting out agent required.

Using organic solvents and salting out agents as above stated and an appropriate emulsifying agent such as neutral Turkey red oil, various industrially useful dilute emulsions of substances may be formed. For example metallic salts insoluble in water but soluble in organic solvents such as copper oleate or copper resinate dissolved in amyl alcohol may be used to form an aqueous emulsion for preserving timber and fabric; an aqueous emulsion of aluminum oleate dissolved in amyl alcohol may be used for waterproofing; an aqueous emulsion of ortho-dichlorbenzene dissolved in butyl alcohol may be used as an insecticide; and an emulsion of organic coloring compounds derived from anthraquinone (e. g. alizarin) dissolved in butyl lactate may be used for dyeing purposes.

The following examples are illustrative of the manner in which the invention can be carried into effect:—

Example I.—15 grams of copper resinate are dissolved in 250 grams of amyl alcohol. This solution is then mixed with 250 grams of Turkey red oil. The mixture is then increased in bulk to 5 litres by emulsification in water in which 235 grams of crystallized sodium acetate have been dissolved.

Instead of copper resinate only, a mixture of copper oleate and copper resinate may be employed and if desired, a small amount of mercury resinate to increase the virulence of the emulsion may be used.

Example II.—Instead of the amyl alcohol in Example I, the same amount of butyl alcohol may be used, in which case the amount of the salting out agent required (sodium acetate) is 530 grams.

Example III.—Instead of the 530 grams of sodium acetate in Example II 200 grams of sodium chloride may be used.

Example IV.—Instead of the amyl alcohol in Example I the same amount of paraldehyde may be used, in which case the amount of sodium acetate required is 940 grams.

Example V.—Instead of the amyl alcohol in Example I, the same amount of diacetone alcohol may be used, in which case the amount of salting out agent required is 1000 grams.

Example VI.—Instead of the amyl alcohol in Example I, butyl lactate may be used in which case the amount of sodium acetate required is 250 grams.

*Example VII.*—As much alizarin as will dissolve in 250 grams of butyl lactate is mixed with 250 grams of Turkey red oil and the mixture is increased in bulk to 5 litres by emulsification in water containing 250 grams of sodium acetate.

In all cases the best procedure for economic reasons is to put a maximum quantity of the selected substance into solution in a small quantity of solvent and to increase its bulk by a large quantity of water containing just sufficient salting out agent to reduce the solubility of the solvent in the water.

The selected substance dissolved in its solvent can be emulsified in the aqueous salt solution and be stored as such ready for use, or the addition of the aqueous salt solution, or of this solution and the emulsifier, can be deferred until just prior to use.

What I claim is:—

1. An emulsion of the oil-in-water type, the disperse phase of said emulsion being a solution of copper oleate in butyl alcohol, and the aqueous continuous phase of said emulsion having dissolved therein a salting out agent which is chemically inactive toward said butyl alcohol.

2. An emulsion of the oil-in-water type, the disperse phase of said emulsion being a solution of copper oleate in butyl alcohol, and the aqueous continuous phase of said emulsion having dissolved therein a water-soluble sodium salt which is chemically inactive toward the said butyl alcohol.

3. An emulsion of the oil-in-water type, the disperse phase of said emulsion being a solution of copper resinate in butyl alcohol, and the continuous phase of said emulsion having dissolved therein a salting out agent which is chemically inactive toward said butyl alcohol.

4. An emulsion of the oil-in-water type, the disperse phase of said emulsion being a solution of copper resinate in butyl alcohol, and the continuous phase of said emulsion having dissolved therein a salting out agent chosen from the group consisting of sodium chloride, sodium sulphate, and sodium acetate.

5. An emulsion of the oil-in-water type, the disperse phase of said emulsion being a solution of copper-resinate in butyl lactate, and the continuous phase of said emulsion having dissolved therein a salting out agent which is chemically inactive toward said butyl lactate.

6. An emulsion of the oil-in-water type, the disperse phase of said emulsion being a solution of copper resinate in butyl lactate, and the continuous phase of said emulsion having dissolved therein a salting out agent chosen from the group consisting of sodium chloride, sodium sulphate, and sodium acetate.

7. An emulsion of the oil-in-water type, the disperse phase of said emulsion being a solution of a substantially water-insoluble material in a neutral polar organic solvent chosen from the group consisting of esters, alcohols, and ketones, said solvent being substantially miscible but not miscible in all proportions with water, and the aqueous continuous phase of said emulsion having dissolved therein a salting out agent which is chemically inactive toward the said organic solvent.

8. An emulsion of the oil-in-water type, the disperse phase of said emulsion being a solution of substantially water-insoluble material in a neutral polar organic solvent chosen from the group consisting of esters, alcohols, and ketones, said solvent being substantially miscible but not miscible in all proportions with water, and the aqueous continuous phase of said emulsion having dissolved therein a water-soluble sodium salt which is chemically inactive toward the said organic solvent.

9. An emulsion of the oil-in-water type, the disperse phase of said emulsion being a solution of a substantially water-insoluble material in an aliphatic alcohol which is substantially miscible but not miscible in all proportions with water, and the aqueous continuous phase of said emulsion having dissolved therein a salting out agent which is chemically inactive toward the acid organic solvent.

10. An emulsion of the oil-in-water type, the disperse phase of said emulsion being a solution of a substantially water-insoluble material in an aliphatic alcohol which is substantially miscible but not miscible in all proportions with water, and the aqueous continuous phase of said emulsion having dissolved therein a water-soluble sodium salt which is chemically inactive toward the said organic solvent.

11. An emulsion of the oil-in-water type, the disperse phase of said emulsion being a solution of a substantially water-insoluble material in a neutral polar organic solvent chosen from the group consisting of alkyl esters of fatty acids, said solvent being substantially miscible but not miscible in all proportions with water, and the aqueous continuous phase of said emulsion having dissolved therein a salting out agent which is chemically inactive toward the said organic solvent.

12. An emulsion of the oil-in-water type, the disperse phase of said emulsion being a solution of a substantially water-insoluble material in a neutral polar organic solvent chosen from the group consisting of alkyl esters of fatty acids, said solvent being substantially miscible but not miscible in all proportions with water, and the aqueous continuous phase of said emulsion having dissolved therein a salting out agent which is chemically inactive toward the said organic solvent, said salting out agent being chosen from the group consisting of sodium chloride, sodium sulphate, and sodium acetate.

13. An emulsion of the oil-in-water type, the disperse phase of said emulsion being a solution of a substantially water-insoluble copper salt of an organic acid in a neutral polar organic solvent chosen from the group consisting of esters, alcohols, and ketones, said solvent being substantially miscible but not miscible in all proportions with water, and the aqueous continous phase of said emulsion having dissolved therein a salting out agent which is chemically inactive toward the said organic solvent.

14. An emulsion of the oil-in-water type, the disperse phase of said emulsion being a solution of a substantially water-insoluble copper salt of an organic acid in a neutral polar organic solvent chosen from the group consisting of esters, alcohols, and ketones, said solvent being substantially miscible but not miscible in all proportions with water, and the aqueous continuous phase of said emulsion having dissolved therein a water-soluble sodium salt which is chemically inactive toward the said organic solvent.

HERBERT LANGWELL.